United States Patent
Reynolds et al.

(10) Patent No.: US 10,843,244 B2
(45) Date of Patent: Nov. 24, 2020

(54) METHODS FOR BIOREMEDIATION OF HYDROCARBON-CONTAMINATED MEDIA

(71) Applicant: Bulldog Green Remediation, Inc., Pleasant Hill, CA (US)

(72) Inventors: Kent Reynolds, Clayton, CA (US); Gregory McIver, Grass Valley, CA (US)

(73) Assignee: Bulldog Green Remediation, Inc., Pleasant Hill, CA (US)

( * ) Notice: Subject to any disclaimer, the term of this patent is extended or adjusted under 35 U.S.C. 154(b) by 318 days.

(21) Appl. No.: 15/684,296

(22) Filed: Aug. 23, 2017

(65) Prior Publication Data

US 2018/0056346 A1 Mar. 1, 2018

Related U.S. Application Data

(60) Provisional application No. 62/378,278, filed on Aug. 23, 2016.

(51) Int. Cl.
| | |
|---|---|
| *B09C 1/10* | (2006.01) |
| *C02F 3/34* | (2006.01) |
| *C02F 103/06* | (2006.01) |
| *C02F 101/32* | (2006.01) |

(52) U.S. Cl.
CPC .............. *B09C 1/10* (2013.01); *B09C 1/105* (2013.01); *C02F 3/344* (2013.01); *B09C 2101/00* (2013.01); *C02F 3/343* (2013.01); *C02F 2101/32* (2013.01); *C02F 2103/06* (2013.01); *C02F 2305/04* (2013.01)

(58) Field of Classification Search
CPC ......... B09C 1/05; B09C 1/10; B09C 2101/00; C02F 3/343; C02F 3/344; C02F 2101/32; C02F 2103/06; C02F 2305/04

USPC ..................................................... 435/262.5
See application file for complete search history.

(56) References Cited

U.S. PATENT DOCUMENTS

| | | | |
|---|---|---|---|
| 3,616,204 | A | 10/1971 | Linn |
| 5,494,580 | A | 2/1996 | Baskys et al. |
| 5,618,727 | A | 4/1997 | Lajoie et al. |
| 5,980,747 | A | 11/1999 | Vandenbergh et al. |
| 6,110,372 | A | 8/2000 | Perriello |
| 6,245,552 | B1 | 6/2001 | Glendening et al. |
| 6,422,789 | B1 | 7/2002 | Brewer |
| 6,468,782 | B1 | 10/2002 | Tunacliffe et al. |
| 6,762,047 | B2 | 7/2004 | Vandenbergh |
| 7,255,514 | B2 | 8/2007 | Benjamin et al. |
| 7,399,141 | B2 | 7/2008 | Benjamin et al. |

(Continued)

FOREIGN PATENT DOCUMENTS

| | | |
|---|---|---|
| CA | 2596386 | 3/2014 |
| CN | 102337226 | 2/2012 |

(Continued)

OTHER PUBLICATIONS

Lwowitch Baranov Gennady, "English machine translation of DE-19652580-A1". Translated on Sep. 4, 2020.*

*Primary Examiner* — Liban M Hassan
(74) *Attorney, Agent, or Firm* — Ryan P. Cox; Robert R. Riddle; Reed Smith LLP

(57) ABSTRACT

Methods of bioremediation of hydrocarbon-contaminated media using *Pseudomonas* sp. which can efficiently reduce hydrocarbon contamination in soil, sediment or water in a short period of time are provided.

18 Claims, 8 Drawing Sheets

(56) References Cited

U.S. PATENT DOCUMENTS

| | | | |
|---|---|---|---|
| 7,935,516 B2 | 5/2011 | Brigmon et al. | |
| 7,975,851 B2 | 7/2011 | Kossowan et al. | |
| 8,187,862 B2 | 5/2012 | Saul et al. | |
| 8,444,962 B2 | 5/2013 | Helmke et al. | |
| 8,980,619 B2 | 3/2015 | Upreti et al. | |
| 9,034,633 B2 | 5/2015 | Kumar et al. | |
| 9,199,288 B2 | 12/2015 | Saul et al. | |
| 2005/0028765 A1 | 2/2005 | Schon et al. | |
| 2012/0021358 A1 | 1/2012 | Taguchi et al. | |

FOREIGN PATENT DOCUMENTS

| | | | | |
|---|---|---|---|---|
| CN | 204014429 | | 12/2014 | |
| DE | 19652580 A1 | * | 7/1998 | ............... B09C 1/10 |
| EP | 2360239 | | 8/2011 | |
| EP | 2726224 | | 2/2016 | |
| WO | 2006085848 | | 8/2006 | |
| WO | 2007091974 | | 8/2007 | |

* cited by examiner

METHODS FOR BIOREMEDIATION OF HYDROCARBON-CONTAMINATED MEDIA

CROSS-REFERENCE TO RELATED APPLICATIONS

The present application claims priority to U.S. Provisional Application No. 62/378,278, filed Aug. 23, 2016, the entirety of which is incorporated herein by reference.

BACKGROUND

Hydrocarbon contamination of the environment, particularly soil, sediment and water (including groundwater), is a significant environmental and health concern. Soil, sediment and water can become contaminated with many compounds, including hydrocarbons as the result of petroleum operations ranging from retail gas stations to refining facilities, oil spills and other industrial processes. In order to redevelop a site for public use, environmental regulations often require the reduction of certain contaminants in soil, such as hydrocarbons through various remediation methods to protect human health and the environment. Bioremediation of contaminated soils is a viable and a cost-effective alternative to the conventional method of excavating, transporting and disposing of the soil at a landfill.

Remediation strategies in the environmental industry have included chemical methods for treating contaminants as well as biological components for bioremediation, such as the incorporation of contaminant-reducing microorganisms. In some instances, soils have been supplemented by the addition of nutrients, such as nitrogen, phosphorous and potassium, and adjustment of environmental conditions, such as pH, temperature, moisture and aeration to facilitate native microbial growth. In addition, in other processes, soils have been treated with microorganisms for bioremediation. These strategies, however, often require very specific microorganisms and the addition of further components such as metal nitrates or nutrient sources as well as additional processing steps or features such as subsequent mixing or aeration. Such remediation strategies, including the use of biopiles, can be slow and take considerable time to remediate wastes.

*Pseudomonas putida* is a rod-shaped, flagellated, gram-negative bacterium that is found in most soil and water habitats where there is oxygen. *Pseudomonas putida* has a very diverse aerobic metabolism that is able to degrade organic solvents such as toluene and also to convert styrene oil to biodegradable plastic, polyhydroxyalkanoates (PHA). This bacteria is unique because it has the most genes involved in breaking down aromatic or aliphatic hydrocarbons which are hazardous chemicals caused by burning fuel, coal, tobacco, and other organic matter. *Pseudomonas putida* also has important lipids that are developed as an adaptation mechanism to respond to physical and chemical stresses. The bacteria is able to change its degree of fatty acid saturation, the cyclopropane fatty acids formation, and the cis-trans isomerization. In different phases, the cell changes its characteristics to better respond to the environment. During the transition from growth to stationary phase, there is a higher degree of saturation of fatty acid and a higher membrane fluidity that improves substrate uptake, thus regulating the cell. These characteristics allow *Pseudomonas putida* to survive toxins in the soil and allow it to thrive in contaminated areas. Its metabolism allows these bacteria to convert harmful organic solvents to non-toxic composites that are also essential to bioremediation.

*Pseudomonas putida* is saprophytic and deemed a safe bacterium. In 1982 the US National Institute of Health designated *Pseudomonas putida* a safety strain which meant it could be used to clone genes from other soil-inhabiting bacteria. Certain strains of *Pseudomonas putida* are not pathogenic due to lack of certain genes including those for enzymes that digest cell membranes and walls of humans and plants.

SUMMARY

There is a need for compositions and methods that can perform bioremediation over a wide range of hydrocarbons with simpler, more efficient compositions that can be performed as a one-step process and which also reduce transportation, other operational costs and inefficiencies as well as perform bioremediation of large volumes more quickly.

The present disclosure provides compositions and methods for the bioremediation of hydrocarbon-contaminated media.

In some embodiments, a method is provided which includes providing a hydrocarbon-contaminated medium from a site, suspending at the site at least one dried microorganism in a first aqueous medium to form a microorganism solution, adding a surfactant solution to the microorganism solution to form a treatment solution, and applying the treatment solution to the hydrocarbon-contaminated medium to form a treated hydrocarbon-contaminated medium.

In some embodiments, a method is provided which can include removing the hydrocarbon-contaminated medium from a site and transporting the hydrocarbon-contaminated medium to a mobile processing apparatus located on-site or off-site. The mobile processing apparatus can include a screening and sifting mechanism for removing large debris and objects from the hydrocarbon-contaminated medium, a spray apparatus for providing a spray treatment to the hydrocarbon-contaminated medium, and an emission capture device for capturing vapors and other emissions during processing the hydrocarbon-contaminated medium. The spray treatment can include a surfactant and a consortium of *Pseudomonas* sp. which can include, for example, *P. putida* and *P. fluorescens* species and any combinations thereof. The consortium of *Pseudomonas* sp. can include different strains of *Pseudomonas* sp. and multiple species of *Pseudomonas*. The hydrocarbon-contaminated medium can be processed using the mobile processing apparatus to screen and sift the hydrocarbon-contaminated medium, spray the hydrocarbon-contaminated medium with the spray treatment and eject the hydrocarbon-contaminated medium to yield a treated hydrocarbon-contaminated medium. The treated hydrocarbon-contaminated medium can be transported to a remediation site and can be covered. The treated hydrocarbon-contaminated medium is then allowed to sit for a period of time.

The methods of the present invention provide a one-step treatment for hydrocarbon-contaminated media that can efficiently reduce hydrocarbon content in the medium quickly, often in less than 90 days. The at least one dried microorganism and/or consortium culture can be provided in a freeze-dried format which can reduce costs and inefficiencies in scale-up of the culture, transport of large liquid volumes and inefficiencies in transporting the culture to the site. By using a freeze-dried culture, the costs and inefficiencies are reduced and the culture can be prepared on-site at the time of processing of the hydrocarbon-contaminated medium. In addition, the ex situ treatment of hydrocarbon-contaminated waste on-site to acceptable levels for reuse on-site avoids the need to transport the contaminated material to a separate remediation site or landfill and import backfill material to allow redevelopment of the contaminated site. This translates to significant cost savings for the remediation and clean-up of contaminated sites. Another benefit of the methods of the present invention is the reduction in toxic air emissions that are released as a result of transportation to a landfill, which further limits the environmental impact of the remediation project. The reduction in truck traffic also improves safety on roadways.

This summary is provided to introduce disclosure, certain aspects, advantages and novel features of the invention in a simplified form that are further described below in the detailed description. This summary is not intended to identify key features or essential features of the claimed subject matter, nor is it intended to be used to limit the scope of the claimed subject matter. The features and advantages of the present invention will be readily apparent to those skilled in the art. While numerous changes may be made by those skilled in the art, such changes are within the spirit of the invention.

DRAWINGS

DESCRIPTION

Figure 1:
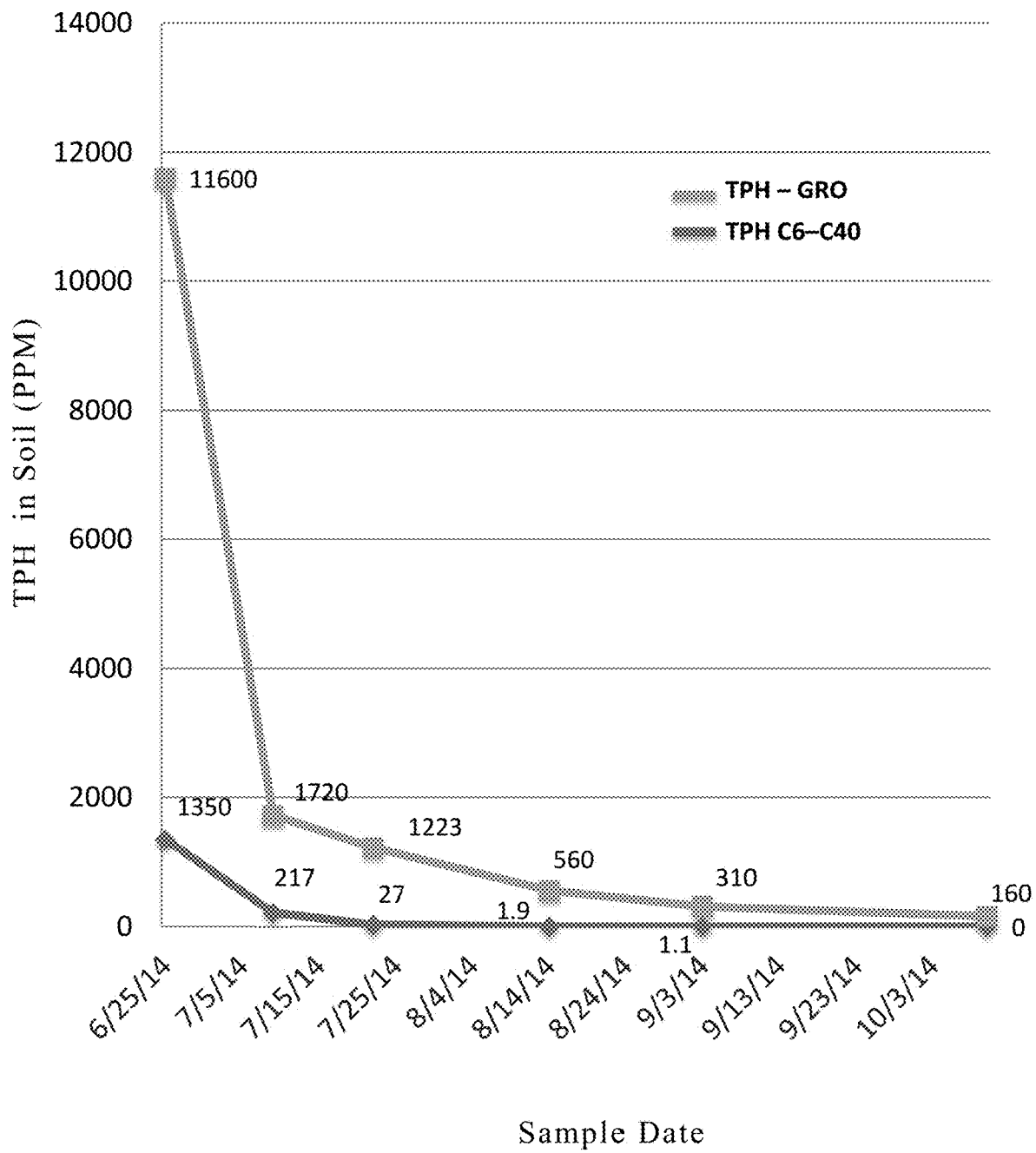
FIG. 1 illustrates the Gasoline Range Organics (GRO) and $C_6$ through $C_{40}$ hydrocarbons at a fueling terminal site.

The present disclosure is directed to methods of remediating hydrocarbons in hydrocarbon-contaminated media.

"Bioremediation" refers to one type of decontamination or remediation method. As used herein, bioremediation refers to a process for the reduction of the level of at least one contaminant using microorganisms. Thus, bioremediation includes any qualitative and/or quantitative reduction in at least one hydrocarbon contaminant, any may include bioaugmentation of a contaminated medium's inherent or acquired microbial population.

"Total petroleum hydrocarbons" ("TPH") describes the family of compounds that originally come from crude oil. This classification includes several hundred compounds which include, by way of example but not limitation, hexane, diesel fuel, jet fuel, motor or lubricating oils, mineral oils, benzene, toluene, xylenes, naphthalene, and fluorine, as well as other petroleum products and gasoline components. Throughout this disclosure, TPH may refer to a class of hydrocarbons based on the number of carbon atoms contained in the hydrocarbon structure. For example, $C_6$ to $C_{44}$ would refer to the TPH of hydrocarbons with 6 to 44 carbon atoms per molecule. TPH concentrations may be measured using EPA Method 8015b.

In some embodiments, a method is provided which includes providing a hydrocarbon-contaminated medium from a site, suspending at the site at least one dried microorganism in a first aqueous medium to form a microorganism solution, adding a surfactant solution to the microorganism solution to form a treatment solution, and applying the treatment solution to the hydrocarbon-contaminated medium to form a treated hydrocarbon-contaminated medium. In certain aspects, the method can further include transporting the hydrocarbon-contaminated medium to a treatment site. In some embodiments, the method can include covering the treated hydrocarbon-contaminated medium. In certain aspects, the step of suspending the at least one dried microorganism in a first aqueous medium to form a microorganism solution can be performed in a first tank. In certain aspects, the method can include preparing the surfactant solution by combining one or more surfactants in a second aqueous medium in a second tank. In some instances, the adding the microorganism solution to the surfactant solution to form a treatment solution is performed in a third tank. In some aspects, the treatment solution can be conveyed to a spraying apparatus. In some instances, the method can further include a soil processing system. In some embodiments, the soil processing apparatus includes one or more of a screen, a shaker, a hopper, and a spray apparatus. In some aspects, the soil processing system further includes a vapor capture system.

In some embodiments, a method for the bioremediation of a hydrocarbon-contaminated medium is provided. The method can include removing the hydrocarbon-contaminated medium from a site and transporting the hydrocarbon-contaminated medium to a mobile processing apparatus located on-site or off-site. The mobile processing apparatus may include a screening and sifting mechanism for removing debris and/or objects from the hydrocarbon-contaminated medium, a spray apparatus for applying a microorganism solution and/or a surfactant solution to the hydrocarbon-contaminated medium, and an emission capture device for capturing vapors and other emissions during processing the hydrocarbon-contaminated medium. The spray treatment can include a surfactant and a consortium of *Pseudomonas* species. The hydrocarbon-contaminated medium can be processed using the mobile processing apparatus to screen and sift the hydrocarbon-contaminated medium, spray the hydrocarbon-contaminated medium with the spray treatment and eject the hydrocarbon-contaminated medium to yield a treated hydrocarbon-contaminated medium. The treated hydrocarbon-contaminated medium can be transported to a remediation site and can be covered. The treated hydrocarbon-contaminated medium is then allowed to sit for a period of time.

The at least one dried microorganism may include a *Pseudomonas* species or a mixture of *Pseudomonas* species. In certain embodiments, the *Pseudomonas* sp. is able to bioremediate hydrocarbons without the addition of nutrients or alkali metal salts or alkali metal nitrates. Examples of suitable *Pseudomonas* species include *Pseudomonas putida*, *Pseudomonas fluorescens*, *Pseudomonas* sp. LD2, *Pseudomonas aeruginosa*, and any combination thereof. In certain embodiments, the *Pseudomonas* species also may include a species capable of producing a biosurfactant compound such as, for example, a rhamnolipid. In some embodiments, the at least one dried microorganism is added as a one-time application and no further microorganisms are added to the hydrocarbon-contaminated medium after the initial application. In some embodiments, the at least one dried microorganism is not supplied with a carrier material where degradation occurs.

In some embodiments, the *Pseudomonas* sp. is one or more of PETROX for PETROX 3, which are available from CL Solutions. PETROX 1 can be useful for the bioremediation of, by way of example but not limitation, BTEX compounds (benzene, toluene, ethylbenzene, xylene), dichlorotoluene (2,5-), dioctylphthalate, fuels (gasoline, diesel, and heating oils), methyl ethyl ketone (2-butanone), methylene chloride, mineral spirits, naphthalene, Stoddard solvents, polycyclic aromatic hydrocarbons, and trimethylbenze isomers. PETROX 3 can be useful for the bioremediation of, by way of example but not limitation, anthracene, chlorotoluene (M-), chlorotoluene (O-), chlorotoluene (P-), chrysene, cresols, creosote, fluorine, oils and greases (food and petroleum), pesticides including 1,2-D-2,4-D, Aldrin, Endrin, pentachlorophenol (PCP), phenanthrene, and phenol. In certain embodiments, the consortium of *Pseudomonas* sp. includes four strains of *P. putida* each of which also may be present in varying ratios.

In some embodiments the at least one dried microorganism is dried by freeze drying or lyophilization. The freeze-dried form allows for the effective transport of bacteria without the additional need for liquid cultures or additional transportation costs. The freeze-dried form can be stored frozen until ready for use and reconstituted in appropriate solutions. In some instances, the at least one dried microorganism may include one or more additives. Such additives include, but are not limited to, dried growth medium, inorganic salts, growth factors, and any combination thereof. The at least one dried microorganism is reconstituted prior to application to the hydrocarbon-contaminated medium. At least one dried microorganism may be reconstituted to any appropriate concentration in an aqueous medium. In some instances, about 8 kilograms of freeze-dried, powdered bacteria can be diluted per about 250 gallons of potable water.

In certain aspects, the hydrocarbon-contaminated medium can include, by way of example but not limitation, sediment, soil, groundwater, surface water, drill cuttings, production sumps, oil spills, light and heavy crude oil sludge, and any combination thereof. The bioremediation process may be performed ex situ or in situ subject to site- and chemical-specific conditions.

Before treatment, the hydrocarbon-contaminated material is processed. Such processing involves removing the hydrocarbon-contaminated medium from a site and transporting the hydrocarbon-contaminated medium to a mobile processing apparatus located on-site or off-site. The hydrocarbon-contaminated medium may be screened and/or sifted to remove large debris and objects from the medium. Additionally, or alternatively, the hydrocarbon-contaminated medium may be manipulated to break-up the material for example, by tilling, shredding, or milling.

In certain embodiments, a bulking agent may be added to or blended into the hydrocarbon-contaminated medium (e.g., soil). Such bulking agents may serve to improve and/or modify the medium (e.g., increase pore space of soil) and thereby increase flow of air and oxygen into the medium when piled. Bulking agents may be particularly effective in combination with active aeration of the medium. In general, suitable bulking agents are dry, biodegradable, and compostable and capable of increasing the amount of air in the medium. Suitable bulking agents should be cost effective with a low purchase price, a high volume to weight ratio, and a relatively low transportation cost. Examples of suitable bulking agents include, but are not limited to, rice hulls, nut shells (e.g., walnut shell, pecan shell), wood chips, and the like. Bulking agents are particularly suitable for use with soil having high clay content. Such bulking agents may be added before or after applying the treatment solution to the hydrocarbon-contaminated medium.

In certain embodiments, a time release oxygen compound also may be added to the soil. For example, magnesium peroxide which produces oxygen when it comes in contact with water.

The surfactant solution is an aqueous solution of one or more surfactants. One advantage of the surfactant solution is that it is able to disperse the microbial solution when applied to the hydrocarbon-contaminated medium which, if desired, allows for a one-time application with no further manipulation (e.g., mixing) of the hydrocarbon-contaminated medium. The surfactant solution also reduces surface tension, improving water penetration which permits the use of less water, which may be beneficial in dry climates.

The surfactants in the surfactant solution generally have one or more of the following characteristics: readily biodegradable per Organization for Economic Co-operation and Development (OECD) methods; nonionic; compatible with other surfactants (e.g., anionic, cationic, nonionic, and amphoteric surfactants); aquatic toxicity profiles that are favorable, such as $LC_{50}$ value of 8.5 and 5.3 mg/L respectively for Flathead minnow and *Daphnia magna*; and have a vapor pressure of less than 0.1 mmHg at 25° C. In addition, suitable surfactants preferably do not contain salts, nitrogen compounds, or sulfates.

In some embodiments, the surfactant is an ethoxylate surfactant such as, for example, a nonionic alcohol ethoxylate. Alcohol ethoxylates are an alcohol-based class of surfactants that includes alcohol propxylates and butoxylates. These are nonionic surfactants that contain a hydrophobic alkyl chain attached via an ether linkage to a hydrophilic ethylene oxide chain and have the general structure $R(OCH_2CH_2)_nOH$, wherein R is a hydrophobic alkyl chain. In general, suitable ethoxylates include those having a strong hydrophilic (ethoxylate chain) and strong hydrophobic (alkyl chain) moiety. In some embodiments, the surfactant is not an ethoxylate surfactant.

Examples of suitable surfactants include, but are not limited to, TOMADOL 91-6 (available from AirProducts) and TERGITOL 15-S-9 (available from Dow). Other surfactants include, but are not limited to, PETROX EC (available from CL Solutions), BIO-SURF (available from Stepan Company), ECOSURF (available from Dow), polysorbate 80 (polyoxyethylene (20) sorbitan monooleate), WINSURF QX-9 (available from Win Chemicals), AMMONYX LO (available from Stepan Company), BIO-SOFT (available from Stepan Company), and IVY-SOL (available from Ivey International). The surfactant solution may comprise of a 0.7% (v/v) mixture of surfactant in water.

In certain embodiments, the surfactant solution may include a biosurfactant (i.e., a surface-active biomolecule produced by microorganisms, or a derivative thereof). Examples of suitable biosurfactants include glycolipids, rhamnolipids, sophorolipids, trehalose lipids, mannosylerythryitol lipids, lipopeptides, lichensyin, and the like. In some instances, a microorganism (e.g. P. aueruginosa), may be included in the surfactant solution or included in the microbial solution to provide the biosurfactant (e.g., a rhamnolipid) to the bioremediation process.

In some embodiments, the surfactant solution is added to the microorganism solution in a ratio of about 1:4 to yield the treatment solution. In certain aspects, the treatment solution can be applied at a rate of 4 gallons per ton of hydrocarbon-contaminated medium. In some instances, this process delivers 3.5 ounces of surfactant per ton of soil.

After application of the microbial solution and surfactant solution, the treated hydrocarbon-contaminated medium can be arranged in biopiles for a time sufficient to the desired amount of bioremediation. In certain embodiments, the period of time that the treated hydrocarbon-contaminated medium is allowed to undergo bioremediation for a period less than or equal to 90 days. In certain embodiments, the level of a hydrocarbon in a treated hydrocarbon-contaminated medium is at least 70% less than the hydrocarbon level of the hydrocarbon-contaminated medium. In other embodiments, the level of a hydrocarbon in a treated hydrocarbon-contaminated medium is at least 90% less than the hydrocarbon level of the hydrocarbon-contaminated medium. In still other embodiments, the level of a hydrocarbon in a treated hydrocarbon-contaminated medium is at least 95% less than the hydrocarbon level of the hydrocarbon-contaminated medium.

In some embodiments, the treated hydrocarbon-contaminated medium can be covered with a covering material to reduce emissions from the biopile and also retain heat and moisture while excluding light. Any suitable covering material may be used, for example, plastic sheeting such as high density polyethylene (HDPE). Additional controls for vapor can include using a negative atmosphere over the pile through the use of vapor extraction piping which can be connected to a vapor extraction blower with the extracted vapors treated via carbon or another suitable technology prior to release to the atmosphere.

In certain embodiments, the biopile may be aerated. Such aeration may be effected through perforated drainpipes placed within the biopile through which air may be moved. The air may be blown through the drainpipes, or alternatively drawn through the biopile via the drainpipes (e.g., using a positive displacement blower). Prior to venting to the atmosphere, the exhaust air may be passed through activated carbon canisters (e.g., granulated activated carbon canisters connected in series) to contain any volatile hydrocarbons. In certain embodiments, the biopile is not aerated. In certain embodiments, water is not added to the biopile. In some embodiments, nutrients are not added to the biopile.

The hydrocarbon that is reduced can include any hydrocarbon contaminant. In some instances, the hydrocarbon is TPH. More preferably, the hydrocarbon contaminant can be between $C_4$ and $C_{50}$. In some instances, the hydrocarbon can be between $C_6$ to $C_{12}$, $C_{13}$ to $C_{22}$, $C_{23}$ to $C_{44}$, $C_6$ and $C_{44}$, or any combination thereof or range there between. In some instances, the hydrocarbon contaminant can be gasoline range organics (GRO) of, for example, $C_4$ to $C_{12}$. The ratio and type of the *Pseudomonas* sp. may be modified depending upon the type of contamination and type of hydrocarbon-contaminated material.

The reduction in hydrocarbon contamination may also be linked to the usability of the treated hydrocarbon-contaminated medium post-treatment. For example, in the case of soil, in some applications, unrestricted use may require levels below 100 mg/Kg for $C_6$-$C_{12}$ and $C_{13}$-$C_{22}$ and less than 1000 mg/Kg of $C_{23}$-$C_{44}$. The methods of the present invention are well adapted to meet these requirements and can reduce the levels of hydrocarbons in contaminated media substantially.

Another benefit of the methods and compositions of the present invention is that the compositions biodegrade, leaving no residuals with a green ecological profile, including no phosphates or alkyl phenol ethyoxylates. The compositions can rapidly penetrate, even through dense clay, to bioremediate hydrocarbon-contaminated media such as soil.

The mobile processing apparatus and/or soil processing system can be any apparatus which permits the processing of hydrocarbon-contaminated media. For example, the mobile processing apparatus can be a commercially available soil processor. U.S. Pat. Nos. 6,422,789 and 7,975,851 and U.S. Patent Application Publication No. 2012/0213589, which are incorporated herein by reference in their entirety, describe exemplary configurations of mobile soil processing apparatuses and portions thereof. The soil processing apparatuses described in these references are for exemplary purposes and are not intended to limit the scope of the mobile soil processing apparatus within the scope of the present disclosure. The soil processing system may include an implement designed to break up the soil, such as one or more of a mill-head (e.g., rotating hammers) or tiller head or shredder. The soil processing system also may include an integrated screen and/or spray apparatus. The soil screening process can be carried out by a sifting mechanism which permits the separation of debris and large materials from the contaminated medium. The spray apparatus within the mobile processing apparatus and/or soil processing system may be configured such that it provides sufficient coverage and penetration of the consortium culture and surfactant into the hydrocarbon-contaminated medium. In operation, the spray apparatus allows for applying liquid materials (e.g., water, surfactant, bacterial consortia) before and/or after the hydrocarbon-contaminated medium is processed by the implement designed to break up the soil material. The spray apparatus, according to certain embodiments, may include a plurality of independently controlled spray nozzles. The mobile processing apparatus and/or soil processing system can also include and emission capture device, such as a fume hood, which can reduce the emission of volatile organic compounds and other pollutants during processing.

The properties of the hydrocarbon-contaminated medium may include limiting factors that affect the bioremediation rate. These include oxygen content, nitrate, phosphorous, potassium, temperature, moisture, salinity and pH.

Bioremediation is effective in an environment with adequate oxygen. Only on rare occasion does bioremediation take place in anoxic environments. The mobile processing apparatus and/or soil processing system is a mechanical way to improve the local environment in the soil. This method can change the physio-chemical characteristic of soil and stimulate the activity of bacteria by increasing the oxygen content in the soil and aiding the release of carbon dioxide. Open marine environments have highly oxygenated surface waters offering an excellent condition for bioremediation. The presence of stagnant water along coasts decreases the amount of oxygen in the sand that decreases the rates of degradation. Biodegrading bacteria need oxygen in order to break down petroleum hydrocarbons. Coincidentally, oxygen content is prevalent along marshes and beaches where oil has contaminated the soil.

Nitrogen, phosphorous and potassium are limiting factors for bioremediation, and their availability to bacteria can affect their ability to consume petroleum hydrocarbons. The addition of nitrogen, phosphorous, and potassium increases the proliferation of biodegrading bacteria, resulting in an increase in degradation rates. The mobile processing apparatus and/or soil processing system can allow for nutrients to be applied to the treated soil during the application of our custom solution. In some embodiments, nutrients are not added to the biopile after the initial application of the custom solution. In some embodiments, carbohydrates are not added to the hydrocarbon-contaminated medium or biopile. In some embodiments, no chemical catalyst reagent is added to the hydrocarbon-contaminated medium or biopile.

Extreme temperatures, too high or too low, will naturally inhibit the thriving of most microorganisms. Such temperatures will also reduce the action of enzymes in a hydrocarbon-contaminated medium (e.g., crude oil spill) environment. As temperature decreases, the rates of degradation decrease, probably because of decreased rates of enzymatic activity. However, bacteria populations in colder climates are more adapted to cold temperatures thereby increasing their capability of degradation at near freezing temperatures. Temperature is perhaps one of the most important factors, affecting both bioremediation and the consistency of the oil spilled. Temperature is a crucial factor in the beginning stages of bioremediation. Approximately 3 months after an oil spill, the rates of degradation at different temperatures are very similar because the remaining compounds in the weathered oil are so difficult to break down. Also, as temperature decreases, viscosity of oil increases, becoming thicker. This increase in viscosity leads to the clumping of oil, which facilitates the use of mechanical methods for its removal out of the water, but hinders the use of suction mechanisms. Also, as temperature decreases volatility decreases, making the oil less likely to evaporate. Therefore, bioremediation is significantly more successful at warmer temperatures.

The effective pH range for bioremediation is considered to be 5.0 to 9.0 with optimal being 6.5 to 7.5. Bioremediation processes may cause the soil pH to drop over time and therefore frequent monitoring of pH is important. Lime or limestone when added to soil can increase pH to neutral values while aluminum sulfate and ferrous sulfate can be added to decrease high pH levels. Lime and sulfur requirements are soil type dependent.

In certain embodiments, the optimal range for factors affecting bioremediation rates for *P. putida* may be those shown in Table 1.

within the soil and hence provide moisture for the purpose of degrading the crude oil by the microorganism. Large quantities of metal salt may also become toxic to the biotic components of the contaminated environment and become recalcitrant inhibiting bioremediation of the crude oil contaminated soil. It may also affect the survivability of the microorganisms in the soil.

In such a situation additional treatment may be necessary. A fusion of phytoremediation and bioremediation may be effective in the treatment of soil where metal salt and crude oil contamination is combined.

Pre-treatment and measurements of chemical and physical parameters may be used to optimize the treatment of the hydrocarbon-contaminated medium. For example, the type of medium, moisture content, density, pH, total organic carbon (TOC), nitrogen and other parameters may be measured, monitored and/or altered using known techniques in the art. In some instances, a method of the present disclosure further comprises sampling the hydrocarbon-contaminated medium for pre-treatment testing. In some instances, a method of the present disclosure further comprises sampling the treated hydrocarbon-contaminated medium for post-treatment testing. The pre-treatment and post-treatment testing can include measuring one or more properties including, by way of example but not limitation, total petroleum hydrocarbons (TPH) in the $C_6$-$C_{44}$ hydrocarbon range using USEPA Method 8015, volatile organic compound (VOC) testing using USEPA Method 8260B, dissolved oxygen, temperature, nitrate, phosphorous, potassium, salinity, pH, and moisture content. Nitrate, phosphorous, potassium, salinity, moisture, moisture and pH can be measured, for example, using a La Motte Smart 3 Electronic Soil lab or equivalent. Dissolved oxygen and temperature can be measured, for example, using a Dynomax dissolved oxygen meter (model #OXG-H) or equivalent. Moisture content can be measured using a Dynomax ML3-Theta Probe Soil Moisture Sensor or equivalent. These testing devices and methods are provided as examples; however, one of ordinary skill in the art will understand various methods for testing the foregoing properties.

In some embodiments, the foregoing properties can be adjusted. Thus, methods of the present disclosure can further include adjusting one or more properties in the hydrocarbon-contaminated medium to provide improved conditions for growth of the microorganism and bioremediation of hydrocarbons by the microorganism. These properties should not

TABLE 1

Optimal Conditions for Bioremediation in Soil Using *P. putida*

| Oxygen | Nitrate | Phosphorus and Potassium | Temp. (° F.) | Moisture Content | Salinity | pH |
|---|---|---|---|---|---|---|
| 4 lbs $O_2$ to 1 lbs TPH treated min dissolved $O_2$ of 2 ppm | 5-20 part $NO_3$ to 100 part carbon $NO_3$ concentrations of 1 ppm | 1-6 part P & K to 100 carbon P & K concentrations of 0.4 ppm | 55-110 80-85 | 12-18% | <5% | 6.5-7.5 |

A correlation between crude oil contamination and metal salt impact on water retention ability of contaminated soil has been established, which consistently affect the activity of microorganisms in the soil microcosm. Therefore, a soil devoid of moisture may not tolerate the survival and growth of microorganisms. Furthermore, heavily contaminated soil will not permit the retention of moisture. Only lightly polluted soil will have capillarity for the movement of water be construed as limiting, as the microorganisms of the present disclosure may grow and perform bioremediation under a range of conditions. In some instances, dissolved oxygen can be adjusted to at least 2 parts per million (ppm). In some aspects, the nitrate concentration can be adjusted to about 1 ppm. In some instances, the nitrate concentration can be adjusted to about 5 to about 20 parts nitrate per 100 parts carbon in the hydrocarbon-contaminated medium. In some instances, the phosphorous concentration can be adjusted to about 0.4 ppm. In some aspects, the phosphorous concentration can be adjusted to about 1 to about 6 parts per 100 parts carbon in the hydrocarbon-contaminated medium. In some aspects, the potassium concentration is adjusted to about 0.4 ppm. In certain aspects, the potassium concentration adjusted to about 1 to about 6 parts per 100 parts carbon in the hydrocarbon-contaminated medium. In some instances, the temperature of the hydrocarbon-contaminated medium is maintained between 55° F. to about 110° F. In some instances, the temperature of the hydrocarbon-contaminated medium is maintained between about 80° F. to about 85° F. In certain aspects, the moisture content of the hydrocarbon-contaminated medium can be adjusted to the optimum range of 12-18%. In certain aspects, the salinity of the hydrocarbon-contaminated medium can be adjusted to less than 5%. In some instances, the pH of the hydrocarbon-contaminated medium can be adjusted to the effective range of 5 to 9, more preferably to the optimum range of 6.5 to 7.5.

The adjustment of the properties of the hydrocarbon-contaminated medium can provide improved conditions for growth of the microorganism and bioremediation of hydrocarbons by the microorganism.

The methods of the present invention may be performed at any type of remediation site, including fuel terminals, former gas stations, sites of oil spills or other hydrocarbon spills, drilling operations, wells, and the like.

It is to be understood that the foregoing embodiments and aspects may be combined, as applicable, without departing from the spirit of this disclosure.

EXAMPLES

The following examples are provided in order to demonstrate and further illustrate certain embodiments and aspects of the present invention and are not to be construed as limiting the scope thereof.

Example 1: Remediation of a Fueling Terminal

Hydrocarbon-contaminated soil from a fueling terminal in an urban setting was treated via the methods and compositions of the present disclosure. Approximately 1,000 tons of hydrocarbon-contaminated soil was treated as a demonstration test with a target clean-up range of 1,000 to 100 ppm, depending on the proximity to groundwater.

Soil was laid out in a one-foot lift and the treatment solution applied to soil at a rate of 4 gallons per ton of hydrocarbon-contaminated soil. Soil was mixed using a backhoe and placed in a soil heap or bio-pile approximately 8 feet in height, and covered with plastic tarps.

Composite soil samples were collected at approximately 0, 10, 30, 50, 70 and 100 days post-treatment. FIG. 1 shows the results of testing, including the TPH for Gasoline Range Organics (GRO) and $C_6$ through $C_{40}$ hydrocarbons.

Example 2: Remediation of a Fueling Terminal

Hydrocarbon-contaminated soil from the fueling terminal in Example 2 was treated via methods and compositions of the present disclosure.

The mobile processing apparatus was equipped with a custom designed vapor collected hood which met SCAQMD requirements. A mixing trailer was plumbed to the mobile processing apparatus for mixing the microbe solution and providing precise flow to the mobile processing apparatus. After processing, treated hydrocarbon-contaminated soil was placed in treatment areas lined with high density polyethyelene. Treatment rows were 200 feet in length and approximately 800 to 900 cubic yards in total size. SVE (passive) piping was installed for SCQMD-PTO compliance. After the rows of treated hydrocarbon-contaminated soil were constructed, the rows were covered with polyethylene sheeting. SVE piping was monitored with PID to track treatment progress.

Figure 2:
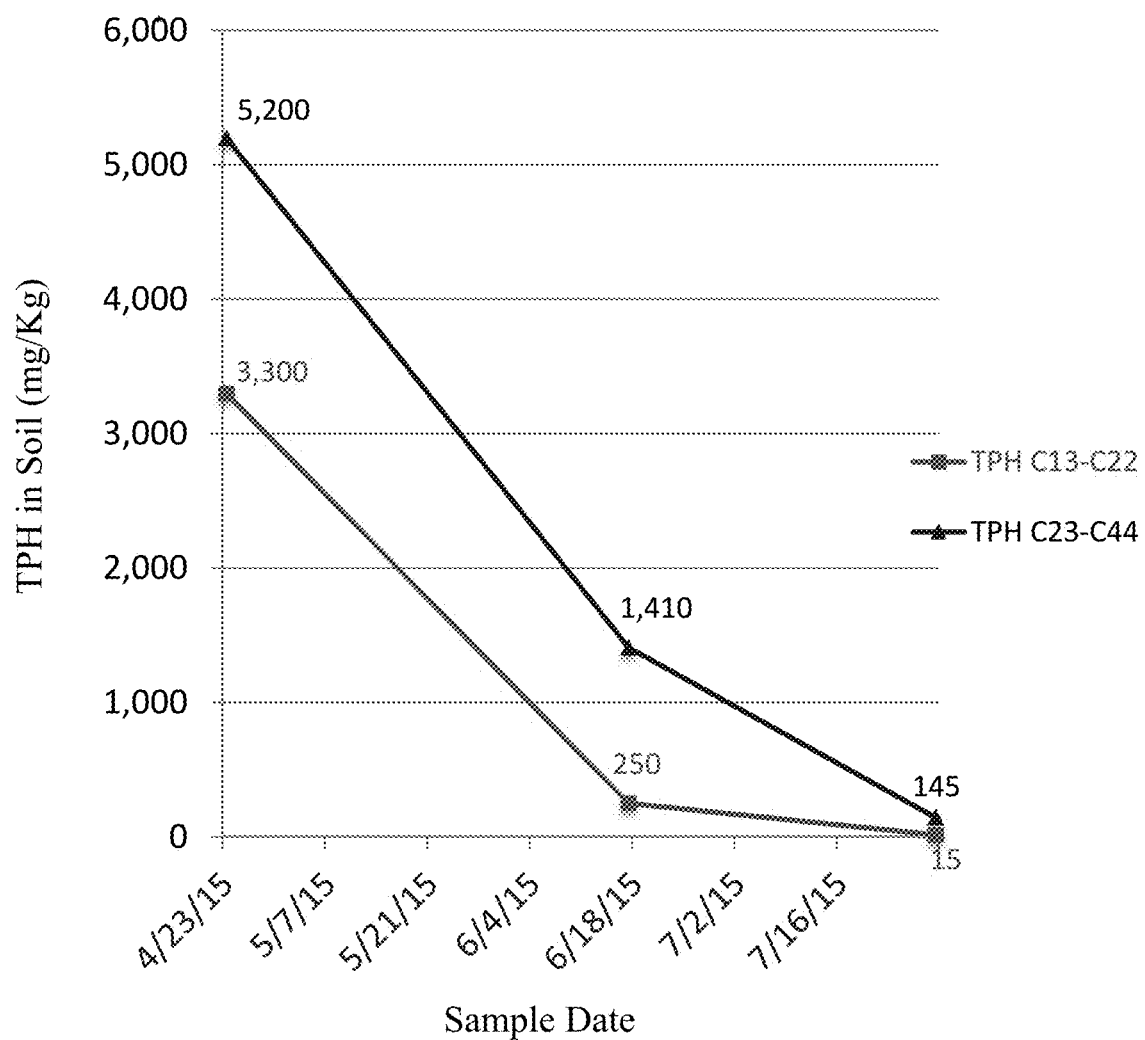
FIG. 2 illustrates the TPH, expressed in mg/Kg of soil, for $C_{13}$ to $C_{22}$ hydrocarbons and for $C_{23}$ to $C_{44}$ hydrocarbons in a treatment basin at 0, 8 and 17 weeks post-treatment. "*" indicates the maximum pre-treatment TPH concentrations.
Figure 3:
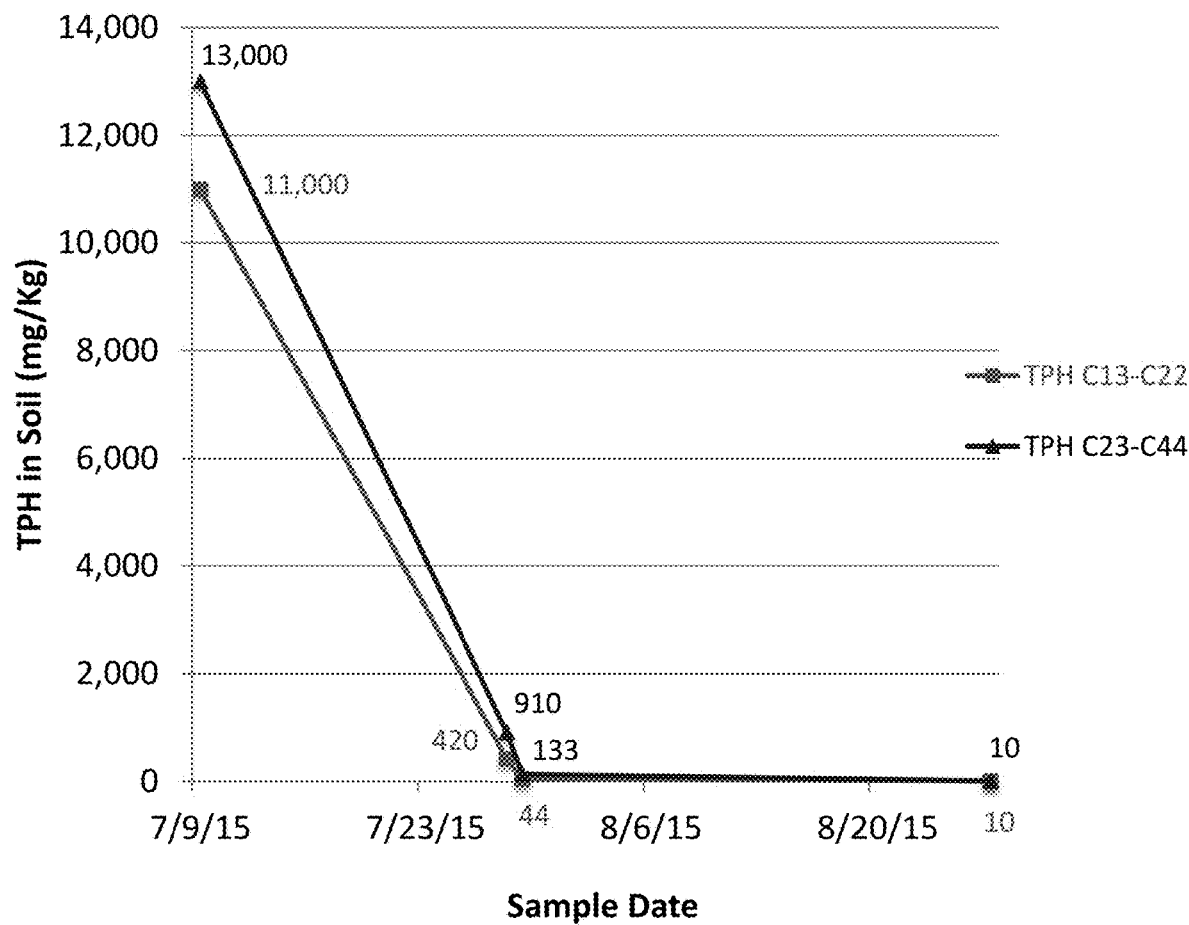
FIG. 3 illustrates the TPH, expressed in mg/Kg of soil, for $C_{13}$ to $C_{22}$ hydrocarbons and for $C_{23}$ to $C_{44}$ hydrocarbons in a second treatment basin at 0, 3 and 11 weeks post-treatment. "*" indicates the maximum pre-treatment TPH concentrations.
Figure 4:
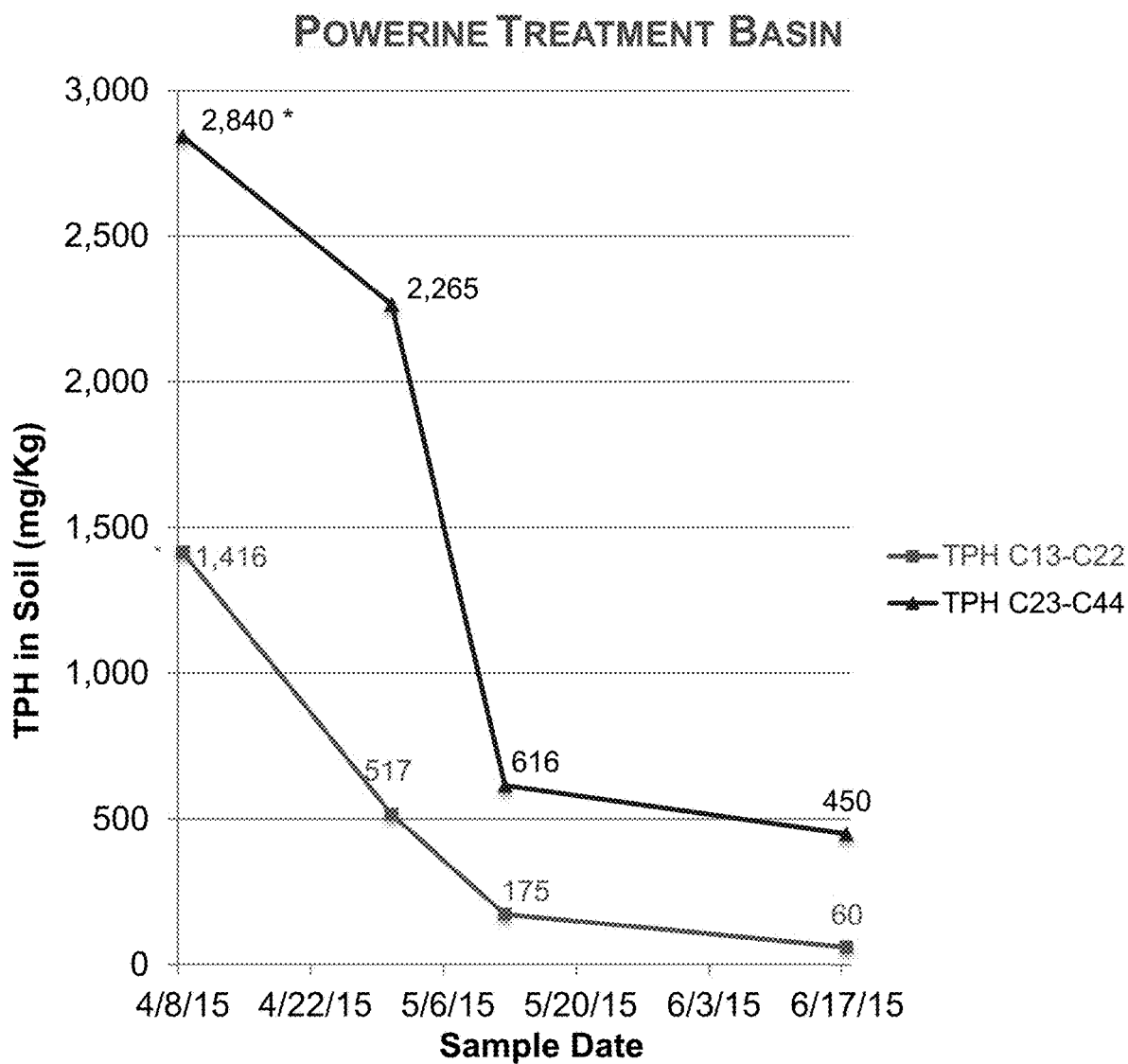
FIG. 4 illustrates the TPH, expressed in mg/Kg of soil, for $C_{13}$ to $C_{22}$ hydrocarbons and for $C_{23}$ to $C_{44}$ hydrocarbons in a third treatment basin at 0, 3, 5 and 16 weeks post-treatment. "*" indicates the maximum pre-treatment TPH concentrations.
Figure 5:
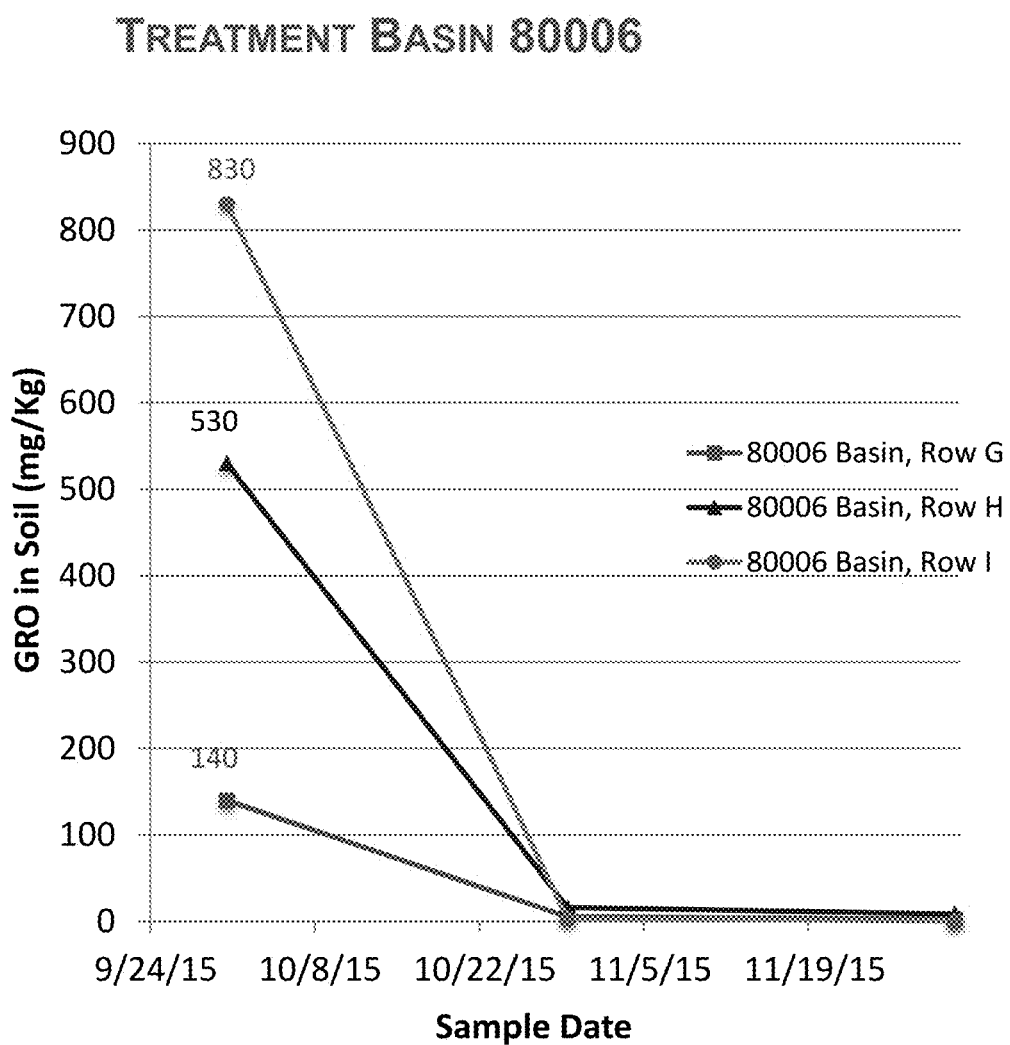
FIG. 5 illustrates the TPH, expressed in mg/Kg of soil, for GRO in a fourth treatment basin at about 1, 5 and 10 weeks post-treatment.

FIG. 2 shows the results of testing, including the TPH, expressed in mg/Kg of soil, for $C_{13}$ to $C_{22}$ hydrocarbons and for $C_{23}$ to $C_{44}$ hydrocarbons in a treatment basin at 0, 8 and 17 weeks post-treatment from 1,141 tons of treated soil with the initial treatment on Apr. 23, 2015. The RWQCB clean-up goal for $C_{13}$-$C_{22}$ hydrocarbons was 100 mg/Kg and 1000 mg/Kg for $C_{23}$-$C_{44}$ hydrocarbons. FIG. 3 shows the results of testing, including the TPH, expressed in mg/Kg of soil, for $C_{13}$ to $C_{22}$ hydrocarbons and for $C_{23}$ to $C_{44}$ hydrocarbons in a second treatment basin at 0, 3 and 11 weeks post-treatment from 1,207 tons of treated soil with the initial treatment on Jul. 9, 2015. The RWQCB clean-up goal for $C_{13}$-$C_{22}$ hydrocarbons was 100 mg/Kg and 1000 mg/Kg for $C_{23}$-$C_{44}$ hydrocarbons. FIG. 4 shows the results of testing, including the TPH, expressed in mg/Kg of soil, for $C_{13}$ to $C_{22}$ hydrocarbons and for $C_{23}$ to $C_{44}$ hydrocarbons in a third treatment basin at 0, 3, 5 and 16 weeks post-treatment from 1,285 tons of treated soil with the initial treatment on Apr. 8, 2015. The RWQCB clean-up goal for $C_{13}$-$C_{22}$ hydrocarbons was 100 mg/Kg and 1000 mg/Kg for $C_{23}$-$C_{44}$ hydrocarbons. FIG. 5 shows the results of testing, including the TPH, expressed in mg/Kg of soil, for GRO in a fourth treatment basin at about 1, 5 and 10 weeks post-treatment from 3,927 tons of treated soil with the initial treatment on Sep. 24, 2015. The clean-up goal was 100 mg/Kg. TPH GRO was analyzed by a certified laboratory using EPA Method 8260b. The levels of GRO in mg/Kg by date and treatment row are shown in Table 2 below.

TABLE 2

Soil Remediation for Treatment Basis 80006 (FIG. 5)

| | GRO (mg/Kg) | | |
|---|---|---|---|
| Treatment Row | Sep. 30, 2015 | Oct. 29, 2015 | Dec. 1, 2015 |
| Row G | 140 | 5.3 | 2.5 |
| Row H | 530 | 16 | 8.4 |
| Row I | 830 | 3.2 | 0.58 |

Figure 6:
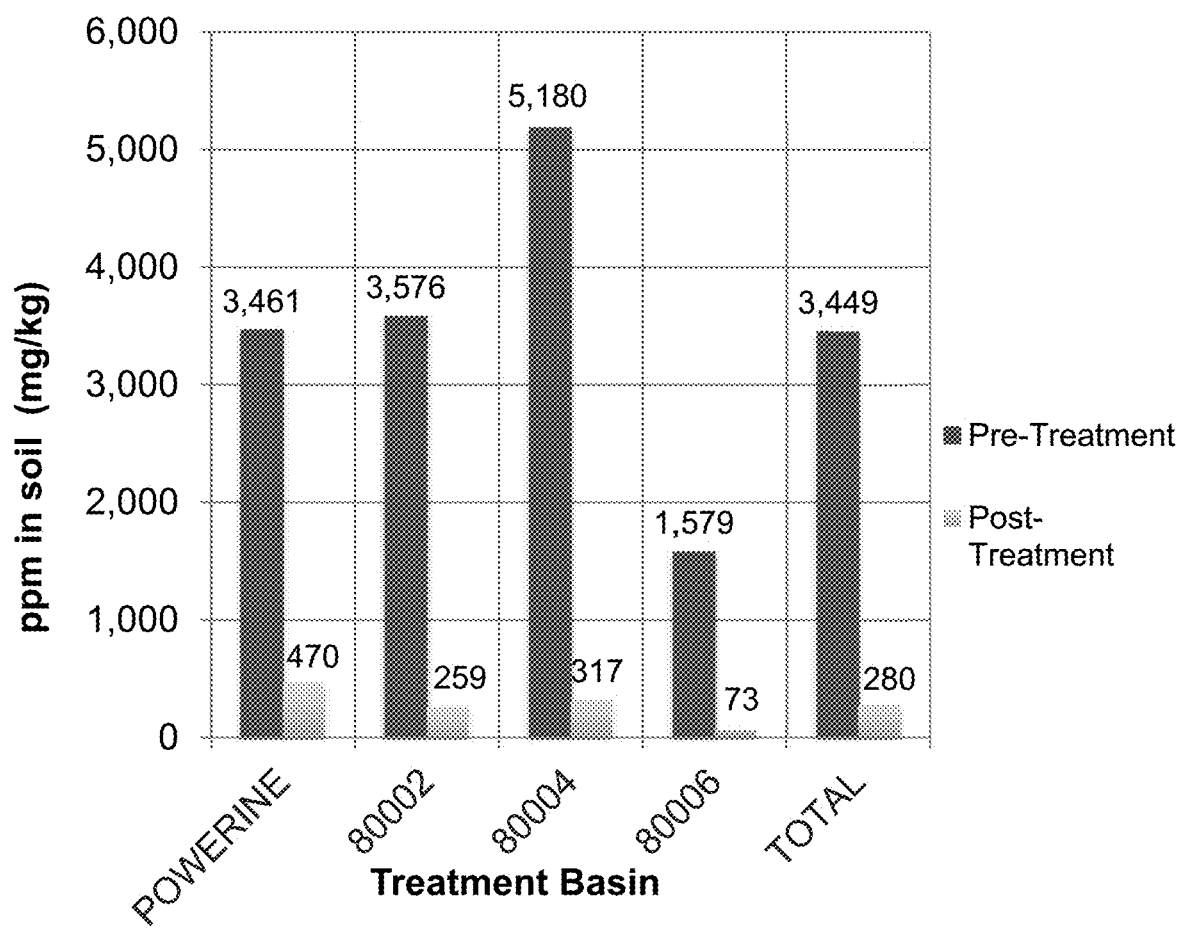
FIG. 6 illustrates the average TPH of $C_4$ to $C_{44}$ hydrocarbons for four treatment basins and the total average of the four treatment basins.
Figure 7:
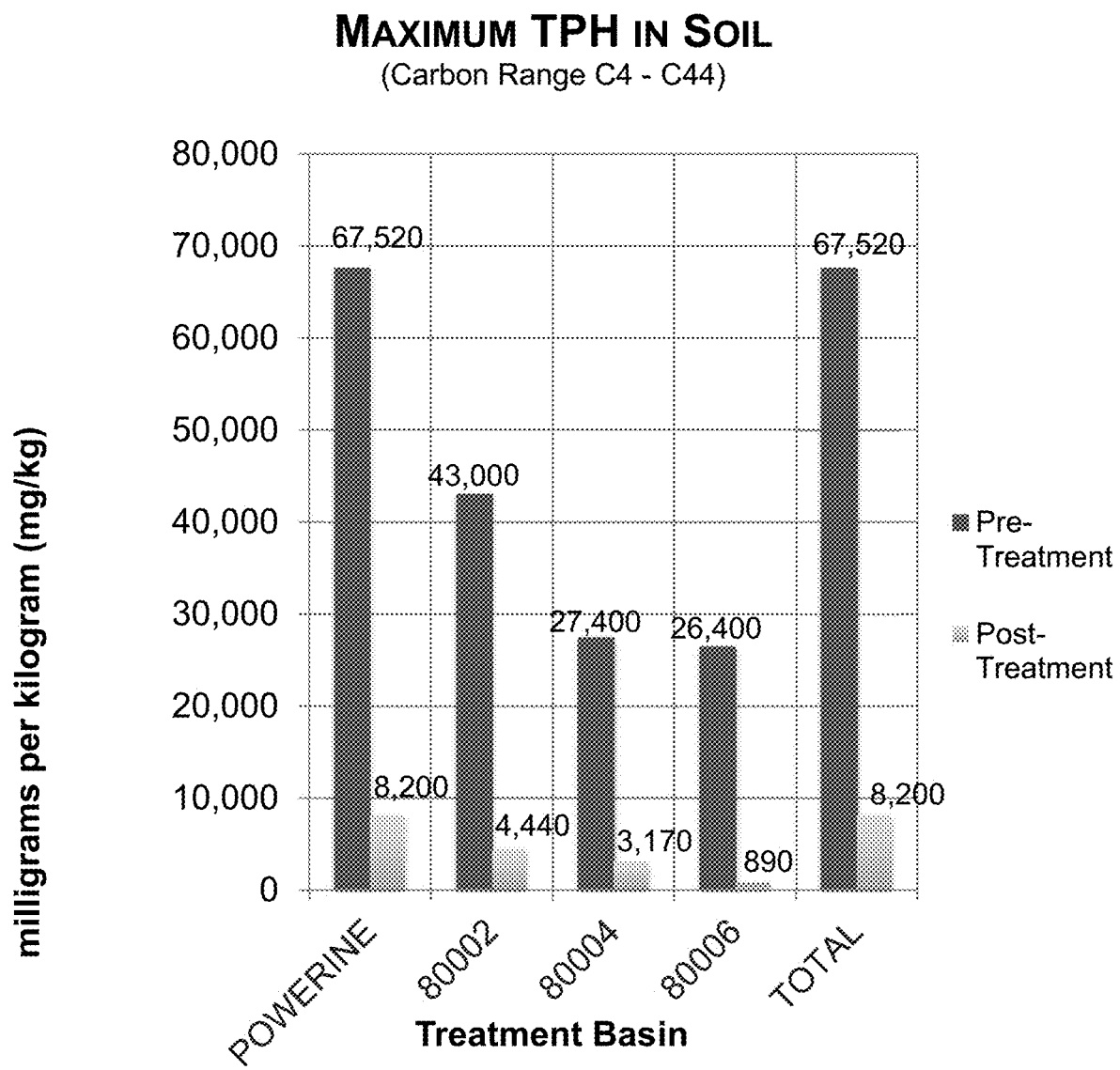
FIG. 7 illustrates the maximum TPH of $C_4$ to $C_{44}$ hydrocarbons for four treatment basins and the total average of the four treatment basins.

FIGS. 6 and 7 show the average and maximum TPH of $C_4$ to $C_{44}$ hydrocarbons, respectively, for the four treatment basins and the total of the four treatment basins. The quantities of soil treated for each treatment were 11,469 tons (Powerine), 9,795 tons (80002), 8,338 tons (80004) and 6,542 tons (80006) which were treated for 7-17 weeks, 9-17 weeks, 11-20 weeks, and 9-11 weeks, respectively. Thus, as shown in FIGS. 6-7, 36,144 tons were treated in between 7-20 weeks.

Figure 8:
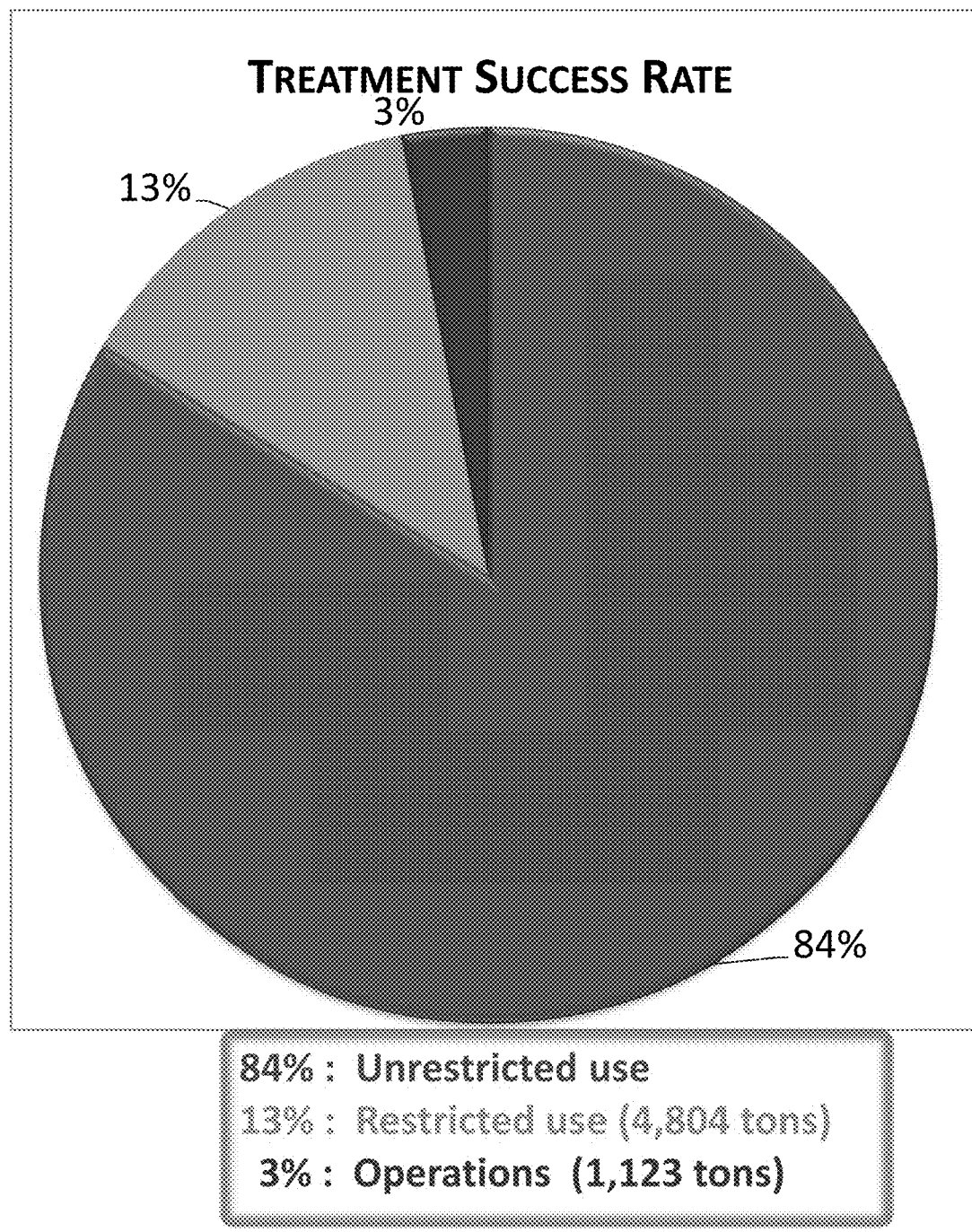
FIG. 8 illustrates the treatment success rate for hydrocarbon bioremediation.

FIG. 8 shows the treatment success rate for treatment of the soil with respect to the requirements in Table 3 below.

TABLE 3

Soil Remediation Requirements

| | Carbon Range (mg/Kg) | | |
|---|---|---|---|
| Soil Use | $C_6$-$C_{12}$ | $C_{13}$-$C_{22}$ | $C_{23}$-$C_{44}$ |
| Unrestricted Use | <100 | <100 | <1,000 |
| Restricted Use (5 feet below ground surface) | <500 | <1,000 | <10,000 |
| Operations | >500 | >1,000 | >10,000 |

In addition, by treating the hydrocarbon contamination on site, without transporting the contaminated soil and backfilling, the present method was able to save an estimated $1.3 million in additional costs. Furthermore, a total of approximately 85,000 tons of contaminated soil was able to be successfully treated ahead of schedule with hydrocarbon levels reduced to target levels.

Example 3: Formulation and Application of Treatment Solution

A consortium of *Pseudomonas* bacteria can be produced at an off-site laboratory. The bacteria can be freeze-dried and shipped in a solid powdered state to the site, within a vacuum-sealed container, and kept frozen. Once needed the freeze-dried bacteria can be formulated in a mixing trailer with a first set of tanks, a second set of tanks and a third set of tanks. The first set of tanks can be 4,275-gallon storage totes while the second set of tanks can be two 1,250-gallon tanks. In the first set of tanks, 8 kilograms of the freeze-dried, powdered bacteria can be constituted with 250 gallons of potable water. In the second set of tanks, 7 gallons of surfactant can be combined with 1,000 gallons of potable water, resulting in a 0.7% solution. Within 24 to 48 hours, the 250 gallons of inoculated bacteria can be combined with 0.7% surfactant solution and conveyed via flexible hoses to spray nozzles within a soil processing system and applied to hydrocarbon-contaminated soil at a rate of 4 gallons per ton of soil. This results in a modest increase in moisture of soil.

The bacterial component, prior to reconstitution can be stored refrigerated for up to two weeks, while the reconstituted bacterial solution should be used within 48 hours of reconstitution. The treatment solution, including the microorganism solution and the surfactant solution, can provide about 3.5 ounces of surfactant per ton of soil treated which is a recommended rate but not an absolute requirement.

Therefore, the present invention is well adapted to attain the ends and advantaged mentioned as well as those inherent therein. While numerous changes may be made by those skilled in the art, such changes are encompassed within the spirit of this invention as illustrated, in part, by the appended claims.

What is claimed is:

1. A method comprising:
   providing a hydrocarbon-contaminated medium;
   suspending at least one dried microorganism in a first aqueous medium to form a microorganism solution;
   combining a surfactant solution comprising a surfactant with the microorganism solution to form a treatment solution; and
   applying the treatment solution to the hydrocarbon-contaminated medium to form a treated hydrocarbon-contaminated medium,
   wherein the treatment solution does not include an alkali metal nitrate and does not include a carbohydrate.

2. The method of claim 1, further comprising manipulating the hydrocarbon-contaminated medium by one or more of sifting, tilling, shredding, and milling.

3. The method of claim 1, further comprising adding a bulking agent to the hydrocarbon-contaminated medium.

4. The method of claim 3, wherein the bulking agent is rice hulls.

5. The method of claim 1, wherein the at least one dried microorganism is freeze dried.

6. The method of claim 1, wherein the at least one dried microorganism comprises a *Pseudomonas* species.

7. The method of claim 1, wherein the surfactant solution comprises a nonionic alcohol ethoxylate.

8. The method of claim 1, wherein the surfactant solution comprises a biosurfactant.

9. The method of claim 1, further comprising aerating the treated hydrocarbon-contaminated medium.

10. The method of claim 1, further comprising capturing volatile hydrocarbons from the treated hydrocarbon-contaminated medium.

11. The method claim 1, further comprising obtaining a sample of the hydrocarbon-contaminated medium prior to applying the treatment solution to the hydrocarbon-contaminated medium and performing a pre-treatment test on the sample.

12. The method of claim 11, wherein the pre-treatment test measures at least one property chosen from total petroleum hydrocarbons in the $C_6$-$C_{44}$ range, volatile organic compounds, dissolved oxygen, temperature, nitrate concentration, phosphorous concentration, potassium concentration, salinity, moisture, and pH.

13. The method of claim 12, further comprising adjusting the at least one property in the hydrocarbon-contaminated medium.

14. The method claim 1, further comprising obtaining a sample of the treated hydrocarbon-contaminated medium after applying the treatment solution to the hydrocarbon-contaminated medium and performing a post-treatment test on the sample.

15. The method of claim 13, wherein the treatment solution comprises at least one *Pseudomonas* species reconstituted from a freeze-dried preparation.

16. The method of claim 13, wherein the treatment solution further comprises a surfactant.

17. The method of claim 1, wherein the surfactant is a nonionic alcohol ethoxylate.

18. The method of claim 13, further comprising aerating the treated hydrocarbon-contaminated medium.

* * * * *